United States Patent [19]

Frasier

[11] Patent Number: 5,764,148
[45] Date of Patent: *Jun. 9, 1998

[54] ELECTRONIC WATER UTILITY SAFETY AND MONITORING APPARATUS

[76] Inventor: Berwyn Travis Frasier, Rte. 7, Box 43-B, Sparta, Tenn. 38583

[ * ] Notice: The term of this patent shall not extend beyond the expiration date of Pat. No. 5,539,384.

[21] Appl. No.: 795,678

[22] Filed: Feb. 6, 1997

[51] Int. Cl.⁶ ..................... G08B 21/00
[52] U.S. Cl. ............ 340/626; 340/606; 340/611; 137/551; 137/557; 73/40.5 R
[58] Field of Search ............ 340/606, 611, 340/626, 614; 137/551, 557; 73/40.5 R

[56] References Cited

U.S. PATENT DOCUMENTS 4,353,118  10/1982  Heimgartner et al. ............ 364/510
5,539,384  7/1996  Frasier ............ 340/605
5,542,287  8/1996  Powers ............ 73/40.5 R

*Primary Examiner*—Jeffery Hofsass
*Assistant Examiner*—Julie B. Lieu

[57] ABSTRACT

A electronic water utility monitoring system including a control box for the system positionable within the house of a user. Further provided is a first electrical line from the control box to a source of potential within the house. Associated therewith is a second electrical line from the control box to a water line for the house. Also included is a flow metering device mounted on the second electrical line to determine the rate of flow of the water within the water line. Finally, an electrical circuit is included for controlling the box. Such electric circuit has a port for allowing coupling with a conventional computer thereby allowing the storing of the rate of flow of water and further calculating the amount of water consumed over a predetermined amount of time and the price of water consumed.

6 Claims, 3 Drawing Sheets

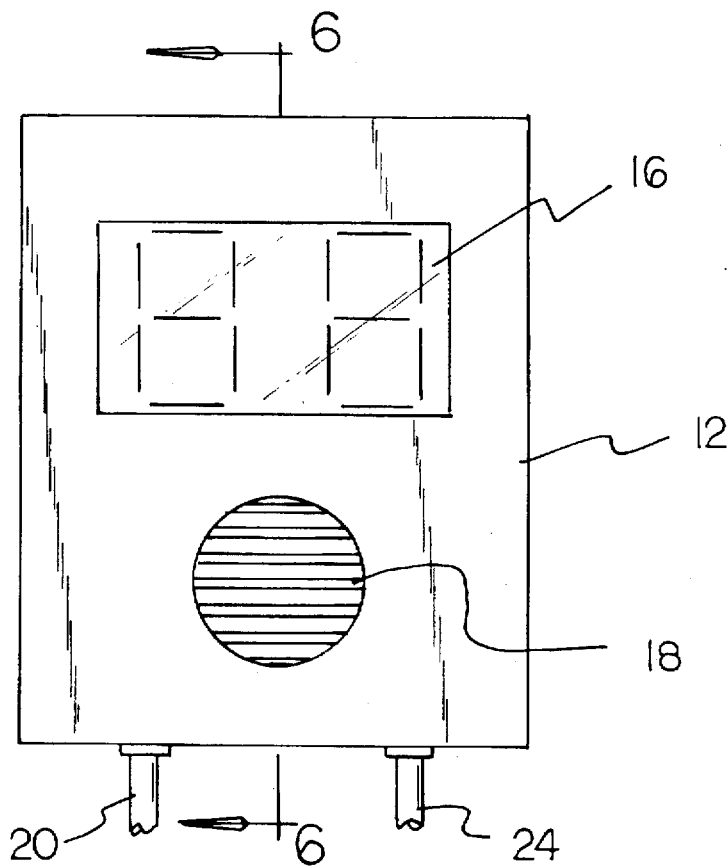
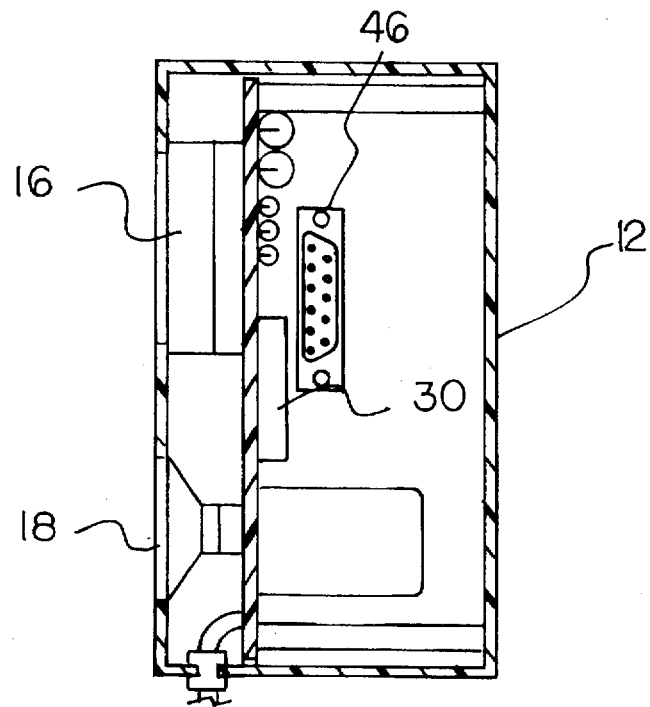

5,764,148

ELECTRONIC WATER UTILITY SAFETY AND MONITORING APPARATUS

BACKGROUND OF THE INVENTION

1. Field of the Invention

The present invention relates to an electronic water utility safety and monitoring apparatus and more particularly pertains to monitoring the rate of flow of water in a household and further calculating the amount of water consumed over a predetermined amount of time and the cost thereof.

2. Description of the Prior Art

The use of water control devices of various designs and configurations is known in the prior art. More specifically, water control devices of various designs and configurations heretofore devised and utilized for the purpose of precluding the flow of water through a house when desired parameters are not met through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,742,841 to Vonderhaar et al, discloses a water shut-off valve.

U.S. Pat. No. 4,845,472 to Gordon et al., discloses a leak sensing alarm and supply shut-off apparatus.

U.S. Pat. No. 4,977,923 to Cho discloses a pilot-controlled water pressure-operated diaphragm shut-off valve.

U.S. Pat. No. 5,153,564 to Hoiberg discloses a leak damage prevention system.

Lastly, U.S. Pat. No. 5,240,028 to Hoch, Jr., et al., discloses a temperature sensitive water supply shut-off system.

In this respect, the electronic water utility safety and monitoring apparatus according to the present invention substantially departs from the conventional concepts and designs of the prior art, and in so doing provides an apparatus primarily developed for the purpose of monitoring the rate of flow of water in a household and further calculating the amount of water consumed over a predetermined amount of time and the cost thereof.

Therefore, it can be appreciated that there exists a continuing need for new and improved electronic water utility safety and monitoring apparatus which can be used for monitoring the rate of flow of water in a household and further calculating the amount of water consumed over a predetermined amount of time and the cost thereof. In this regard, the present invention substantially fulfills this need.

SUMMARY OF THE INVENTION

In view of the foregoing disadvantages inherent in the known types of water control devices of various designs and configurations now present in the prior art, the present invention provides an improved electronic water utility safety and monitoring apparatus. As such, the general purpose of the present invention, which will be described subsequently in greater detail, is to provide a new and improved electronic water utility safety and monitoring apparatus and method which has all the advantages of the prior art and none of the disadvantages.

To attain this, the present invention essentially comprises a new and improved electronic water utility safety system, comprising, in combination, a control box for the system positionable within the house of a user. A light demitting diode display is provided to indicate a sensed water pressure and a rate of flow of water. A buzzer is mounted in the box to generate an audible signal upon the pressure being identified outside of an acceptable range. A first electrical line runs from the control box to a source of potential within the house. A second electrical line runs from the control box to a water line for the house. A pressure sensor is mounted on the second electrical line to determine the pressure within the water line and to allow the indicator to display such determined pressure. A valve is located within the water line adjacent to the pressure sensor to shut off the flow of water upon the pressure being outside of the acceptable range. An electrical circuit is provided for controlling the box. Further provided is a flow metering device mounted on the second electrical line. In use, the flow metering device is adapted to determine the rate of flow of the water within the water line and to allow the display to indicate such determined rate of flow of the water. The control box further includes a port in communication with the electrical circuit for allowing coupling with a conventional computer thereby allowing the storing of the rate of flow of water and further calculating the amount of water consumed over a predetermined amount of time and the price of water consumed.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronic water utility safety and monitoring apparatus which has all the advantages of the prior art water control devices of various designs and configurations and none of the disadvantages.

It is another object of the present invention to provide a new and improved electronic water utility safety and monitoring apparatus which may be easily and efficiently manufactured and marketed.

It is a further object of the present invention to provide a new and improved electronic water utility safety and monitoring apparatus which is of a durable and reliable construction.

An even further object of the present invention is to provide a new and improved electronic water utility safety and monitoring apparatus which is susceptible of a low cost of manufacture with regard to both materials and labor, and which accordingly is then susceptible of low prices of sale to the consuming public, thereby making such water control devices of various designs and configurations economically available to the buying public.

Still yet another object of the present invention is to provide a new and improved electronic water utility safety and monitoring apparatus which provides in the apparatuses and methods of the prior art some of the advantages thereof, while simultaneously overcoming some of the disadvantages normally associated therewith.

Still another object of the present invention is to terminate the water feed to a house when the pressure thereof varies from a predetermined range for more than a predetermined amount of time.

Another object of the present invention is to monitor the rate of flow of water in a household and further calculate the amount of water consumed over a predetermined amount of time and the cost thereof.

Lastly, it is an object of the present invention to provide a electronic water utility monitoring system including a control box for the system positionable within the house of a user. Further provided is a first electrical line from the control box to a source of potential within the house. Associated therewith is a second electrical line from the control box to a water line for the house. Also included is a flow metering device mounted on the second electrical line to determine the rate of flow of the water within the water line. Finally, an electrical circuit is included for controlling the box. Such electric circuit has a port for allowing coupling with a conventional computer thereby allowing the storing of the rate of flow of water and further calculating the amount of water consumed over a predetermined amount of time and the price of water consumed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of the control box shown in FIG. 2.

FIG. 4 is a cross sectional view taken along line 6—6 of FIG. 3.

Similar reference characters refer to similar parts throughout the several views of the drawings.

DESCRIPTION OF THE PREFERRED EMBODIMENT

Figure 1:
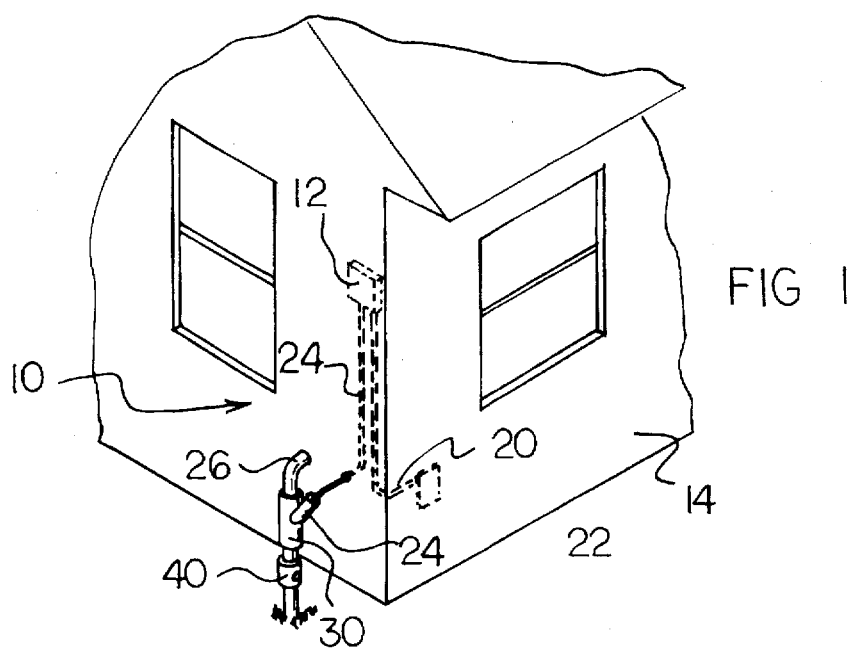
FIG. 1 is a perspective illustration of the exterior of a house equipped with the preferred embodiment of the electronic water utility safety and monitoring apparatus constructed in accordance with the principles of the present invention.
Figure 2:
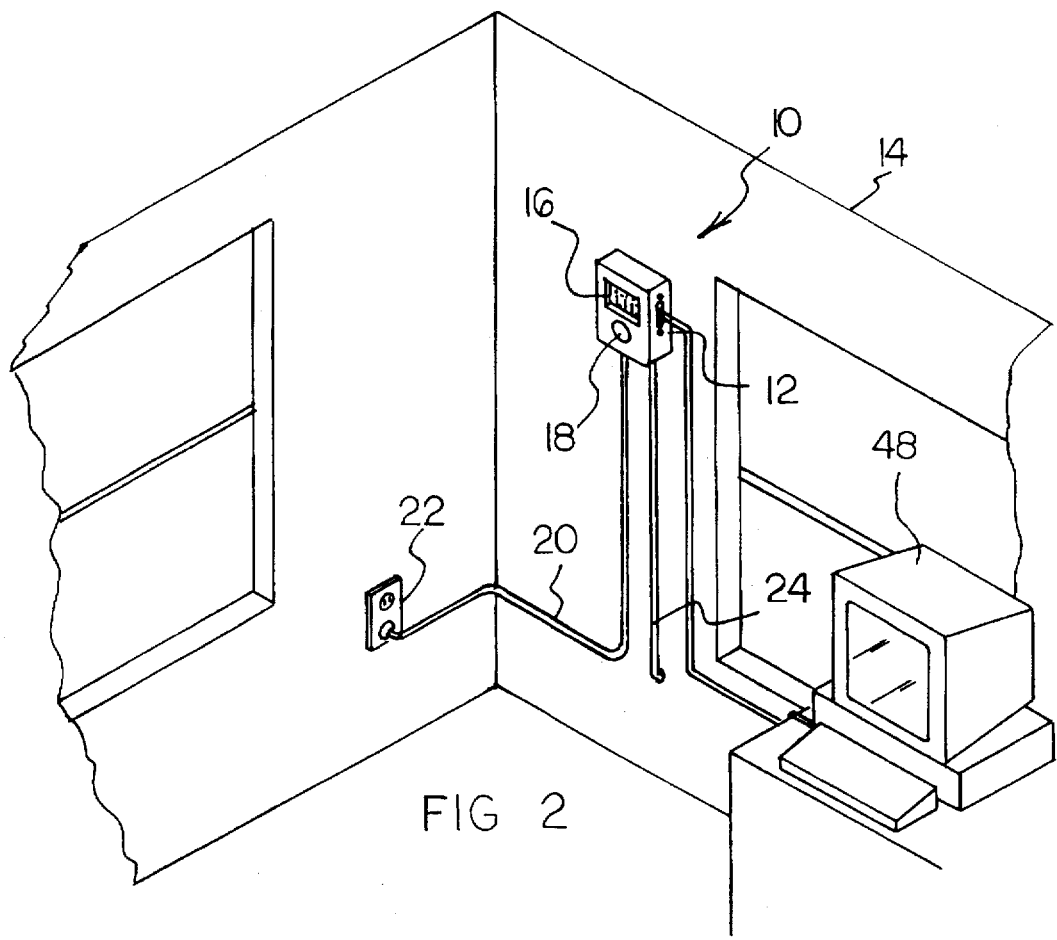
FIG. 2 is a perspective view of the apparatus shown in FIG. 1, but taken from interior of the house.

With reference now to the drawings, and in particular to FIG. 1 thereof, a new and improved electronic water utility safety and monitoring apparatus embodying the principles and concepts of the present invention and generally designated by the reference numeral 10 will be described.

The present invention, the new and improved electronic water utility safety and monitoring apparatus, is comprised of a plurality of components. Such components in their broadest context include a control box, a light emitting diode, a buzzer, a first electrical line, a second electrical line, a pressure sensor, a valve and an electrical circuit. Such components are individually configured and correlated with respect to each other so as to attain the desired objective.

More specifically, the central component of the system 10 is the control box 12. Such control box is for operating the system in an intended manner. It is preferably positioned within the house 14 of the user. In this manner, it may be monitored at a most convenient location.

Located within the control box is a light emitting diode 16. Other visible displays are acceptable. The function of the light emitting diode display is to indicate a sensed water pressure and a rate of flow of water. An unillustrated switch may be utilized to determined which of the above values is displayed.

Also located on the control box is a buzzer 18. The buzzer is mounted in the control box. It functions to generate an audible signal in the event that the pressure is identified in a water line outside of the house which is identified as being outside of an acceptable range of pressure. Ideally, a remote security alarm service is connected with the buzzer. As such, the present invention may be monitored from afar. The remote security alarm is preferably connected via a phone line and is adapted to notify authorities upon the pressure being identified as being outside of an acceptable range of pressure.

Extending downwardly from the control box is a first electrical line 20. Such electrical line extends from the control box to a source of potential 22. Such source of potential is preferably located within the house. The source of potential ideally comprises of a standard AC source in combination with a DC battery backup.

Next provided is a second electrical line 24 on the bottom of the control box 12. Such second electrical line extends from the control box to the water line 26 being sensed for changes and pressure.

In association with the second electrical line 24 and the water line 26 is a pressure sensor 28. Such pressure sensor is mounted on the second electrical line at the water line. The function is to determine the pressure within the water line. This is to then allow the light emitting diode display to disclose to someone viewing the control box what the determined pressure is as determined by the pressure sensor. Also located in the water line adjacent to the pressure sensor is a valve 30. Such valve is located within the water line adjacent to the sensor. Its function is to shut off the flow of water upon the pressure being outside of the acceptable range. Consequently, when the pressure is outside of the range as determined by the sensor and displayed by the light emitting diode display, an electrical circuit within the box will control the functions of the box and switch the orientation of the valve 30 to shut off all flow of water due to an unacceptable situation arising from the pressure within the water line.

It should be noted that the valve is adapted to delay the shutting off of the flow of water until after a predetermined amount of time. Such time preferably comprises a period between 8–30 seconds. By this feature, a continued pressure variation of at least 8 seconds in duration is necessary before the valve is closed. As such, normal operation of ice makers, toilets, and other water consuming device within a household does not effect inadvertent closure of the valve.

Figure 5:
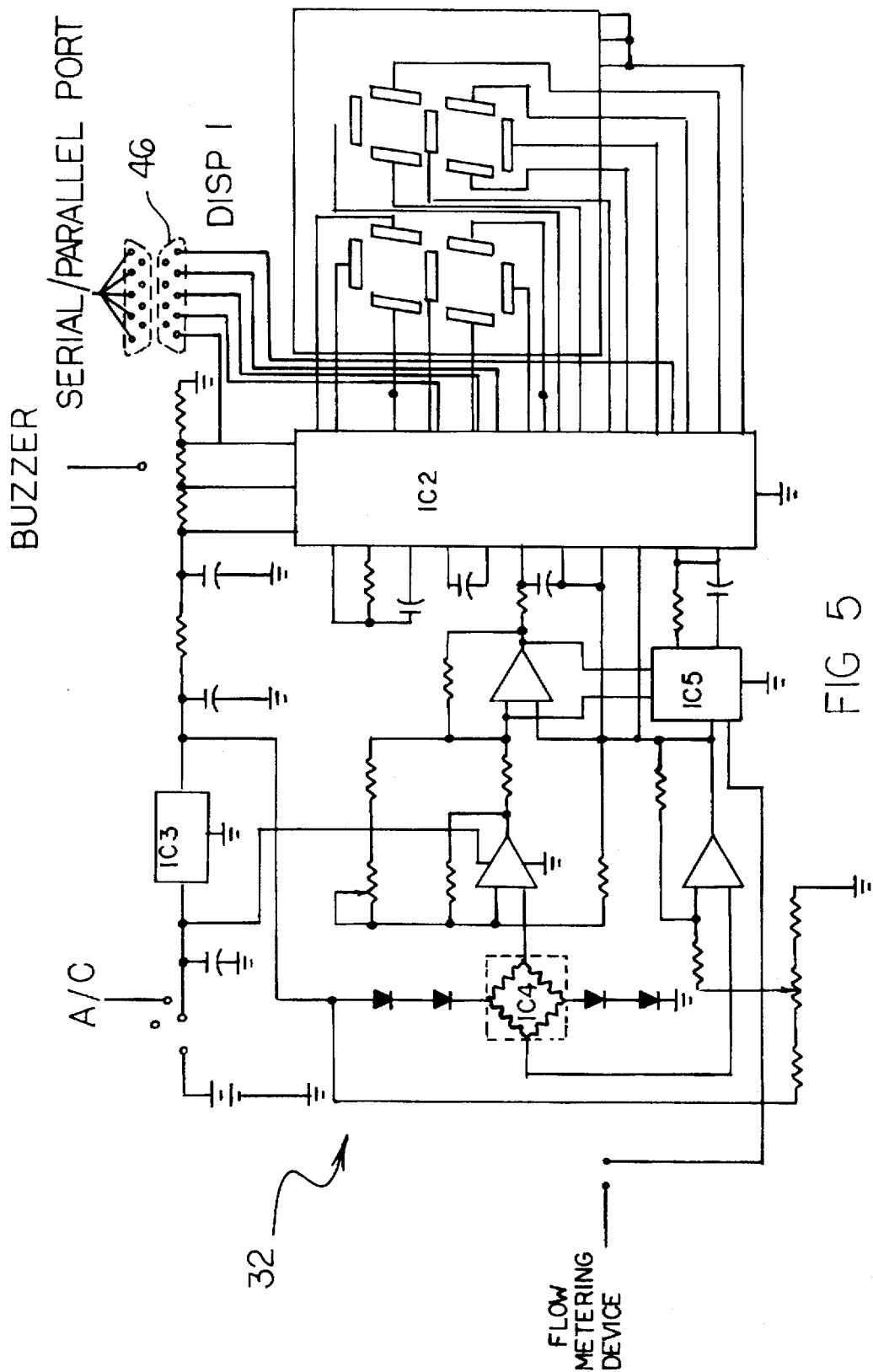
FIG. 5 is an electrical schematic of the control apparatus employed in the device of the prior Figures.

As shown in FIG. 1 & 5, a flow metering device 40 is mounted on the second electrical line. Preferably, such flow metering device is mounted proximate the foregoing valve. In use, the flow metering device is adapted to determine the rate of flow of the water within the water line and to allow the display to indicate such determined rate of flow of the water. The rate may be measured in units such as gallons or meters cubed per day, week, or month.

The control box further includes a port 46 for allowing coupling with a conventional computer 48. Such port may comprise either a parallel port or a series port. In operation, the computer allows the storing of the rate of flow of water and further calculating the amount of water consumed over a predetermined amount of time and the price of water consumed. Software may be provided to facilitate such processing, as is commonly known in the art. It should be noted that the display affords a quick reference of the pressure and rate of water flow when the more comprehensive measurements of the computer are not needed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved electronic water utility safety and monitoring system, comprising, in combination:

a control box for the system positionable within the house of a user;

a digital light emitting diode display mounted to the box to indicate a numerical value indicative of a sensed water pressure and a rate of flow of water;

a buzzer mounted in the box to generate an audible signal upon the pressure being identified outside of an acceptable range;

a first electrical line from the control box to a source of potential within the house;

a second electrical line from the control box to a water line for the house;

a pressure sensor mounted on the second electrical line to determine the pressure within the water line and to allow the display to indicate such determined pressure;

a flow metering device mounted on the second electrical line to determine the rate of flow of the water within the water line and to allow the display to indicate such determined rate of flow of the water;

a valve actuated via a solenoid, the valve located within the water line and mounted thereto adjacent to the pressure sensor in a fashion similar to that of an existing main control valve, the valve adapted to shut off the flow of water automatically upon the pressure being outside of the acceptable range for a predetermined amount of time, the valve adapted to shut off the flow of water manually from the control box at the discretion of a user upon the inspection of the display;

an electrical circuit for controlling the box including a port for allowing coupling with a conventional computer thereby allowing the storing of the rate of flow of water and further calculating the amount of water consumed over a predetermined amount of time and the price of water consumed.

2. A new and improved electronic water utility monitoring system, comprising:

a control box for the system positionable within the house of a user;

a first electrical line from the control box to a source of potential within the house;

a second electrical line from the control box to a water line for the house;

a flow metering device mounted on the second electrical line to determine the rate of flow of the water within the water line;

an electrical circuit for controlling the box including a port for allowing coupling with a conventional computer thereby allowing the storing of the rate of flow of water and further calculating the amount of water consumed over a predetermined amount of time and the price of water consumed;

a pressure sensor mounted on the second electrical line in determine the pressure within the water line; and a valve actuated via a solenoid, the valve located within the water line and mounted thereto adjacent to the pressure sensor in a fashion similar to that of an existing main control valve, the valve adapted to shut off the flow of water automatically upon the pressure being outside of the acceptable range for a predetermined amount of time, the valve adapted to shut off the flow of water manually from the control box at the discretion of a user upon the inspection of the display.

3. A new and improved electronic water utility monitoring system as set forth in claim 2 and further including a digital light emitting diode display mounted to the box to indicate a numerical value indicative of a rate of flow of water, whereby the flow metering device is adapted to allow the display to indicate such determined rate of flow of the water.

4. A new and improved electronic water utility monitoring system as set forth in claim 2 and further including a digital light emitting diode display mounted to the box to indicate a numerical value indicative of a sensed water pressure, whereby the pressure sensor is adapted to allow the display to indicate such determined pressure.

5. A new and improved electronic water utility monitoring system as set forth in claim 2 and further including a buzzer mounted in the box to generate an audible signal upon the pressure being identified outside of an acceptable range.

6. A new and improved electronic water utility safety system, comprising, in combination:

a control box for the system positionable within the house of a user;

a digital light emitting diode display to indicate a numerical value indicative of a sensed water pressure;

a buzzer mounted in the box to generate an audible signal upon the pressure being identified outside of an acceptable range;

a first electrical line from the control box to a source of potential within the house;

a second electrical line from the control box to a water line for the house;

a sensor mounted on the second electrical line to determine the pressure within the water line and to allow the display to indicate such determined pressure;

a valve actuated via a solenoid, the valve located within the water line and mounted thereto adjacent to the sensor in a fashion similar to that of an existing main control valve, the valve adapted to shut off the flow of water automatically upon the pressure being outside of the acceptable range, the valve further adapted to shut off the flow of water manually from the control box at the discretion of a user upon the inspection of the display;

said valve adapted only to shut off the flow of water automatically upon the pressure being outside of the acceptable range after a predetermined amount of time; and an electrical circuit for controlling the box.

* * * * *